United States Patent [19]

Möller et al.

[11] Patent Number: 5,710,207
[45] Date of Patent: Jan. 20, 1998

[54] BLOCK POLYMERS CONTAINING ESTER GROUPS AS DEFOAMERS FOR AQUEOUS SYSTEMS

[75] Inventors: Thomas Möller, Düsseldorf; Ulrich Eicken, Korschenbroich; Herbert Fischer; Horst-W. Wollenweber, both of Düsseldorf; Wolfgang Gress, Wuppertal, all of Germany; Christian de Haut, Boissise le Roi, France; Ulrike Mahler, Suhr, Switzerland; Manfred Gorzinski, Düsseldorf; Hans-Jürgen Sladek, Krefeld, both of Germany

[73] Assignee: Henkel Kommanditgesellschaft auf Aktien, Duesseldorf, Germany

[21] Appl. No.: 615,235

[22] PCT Filed: Sep. 6, 1994

[86] PCT No.: PCT/EP94/02966

§ 371 Date: Apr. 10, 1996

§ 102(e) Date: Apr. 10, 1996

[87] PCT Pub. No.: WO95/07742

PCT Pub. Date: Mar. 23, 1995

[30] Foreign Application Priority Data

Sep. 15, 1993 [DE] Germany ............. 43 31 228.4

[51] Int. Cl.$^6$ ............. C08L 53/00; C08L 33/14; C08K 5/101; B32B 5/16
[52] U.S. Cl. ............. 524/502; 524/317; 524/375; 524/376; 524/377; 524/558; 524/310; 428/404; 428/407
[58] Field of Search ............. 524/317, 375, 524/376, 377, 505, 558, 310; 428/404, 407

[56] References Cited

U.S. PATENT DOCUMENTS 3,405,085 10/1968 Girgeb et al. ............. 524/317

4,132,694 1/1979 Heyden et al. ............. 524/317

FOREIGN PATENT DOCUMENTS

| 0036597 | 9/1981 | European Pat. Off. |
|---|---|---|
| 0117538 | 9/1984 | European Pat. Off. |
| WO 9210266 | 6/1992 | WIPO |
| WO 9211073 | 7/1992 | WIPO |
| WO 9315257 | 8/1993 | WIPO |
| WO 9319150 | 9/1993 | WIPO |

OTHER PUBLICATIONS

Condensed Chemical Dictionary, Seventh Edition, Arthur and Elizabeth Rose, Reinhold Publishing Co. N.Y. pp. 820. Macromolecules, vol. 26, No. 18, 30 Aug. 1993, Washington, US, pp.4845–4853, XP000389712; E.J. Tijsma, L. van der Does, A. Bantjes, N.K. de Vries, I. Vulic, G.H. Werumeus Buning, 'Poly(ether ester)s from Pivalolactone, Alkanediols and Dimethyl Terephthalate. 1. Synthesis, Structure Analysis, and Reaction Mechanism'.

Primary Examiner—Peter A. Szekely
Attorney, Agent, or Firm—Wayne C. Jaeschke; John Daniel Wood; Steven J. Trzaska

[57] ABSTRACT

A method of using compositions as foam regulators for water-based systems with a tendency to foam is provided. The method employs a block copolymer containing ester groups corresponding to general formula (I):

$$A-(CH_2CH_2O)_n-B \quad (I)$$

in which n is an integer of 4 to 300, A is an optionally polymeric hydroxycarboxylic acid function and B is hydrogen, an alkyl or alkenyl radical containing 1 to 22 carbon atoms, a phenyl or benzyl radical or has the same meaning as A. Also provided is a granular free-flowing foam regulating formulation which contains 0.5% by weight to 30% by weight of the block copolymer containing ester groups adsorbed onto from 70% by weight to 99.5% by weight of a granular, substantially inorganic phosphate-free support material.

33 Claims, No Drawings

BLOCK POLYMERS CONTAINING ESTER GROUPS AS DEFOAMERS FOR AQUEOUS SYSTEMS

BACKGROUND OF THE INVENTION

1. Field of the Invention

This invention related to the use of block polymers containing ethylene glycol ether units esterified with optionally polymeric hydroxycarboxylic acids as foam regulators in aqueous systems that would tend to foam without this addition, to pourable and free-flowing, particulate foam inhibiting formulations in which the foam regulators are adsorbed onto water-soluble or water-dispersible support material and to processes for the production of the foam regulators and the particulate foam inhibiting formulations.

2. Discussion of Related Art

Terephehalic acid polyethylene glycol esters and their use as a soil-dissolving component in detergents are known from European patent EP 185 427. European patent application EP 429 307 describes water-soluble block copolymers which are synthesized from carboxylic acid and polyalkylene oxide monomers and which are at least partly biodegradable. According to EP 429 307, the block copolymers in question are used as detergent builders or incrustation inhibitors. Polyesters of dibasic or polybasic carboxylic acids and polyhydric alcohols and also nonionic surfactants are known from European patent application EP 442 1091, according to which these compounds are used as discoloration-inhibiting and soil-removing additives in detergents.

Ester/ether block copolymers derived from diols and complex monohydroxymonocarboxylic acids are known from European patent EP 000 424. The complex monohydroxymonocarboxylic acids are the esterification product of one or more monohydroxymonocarboxylic acids with a monocarboxylic acid free from hydroxyl groups. Ethylene glycol, propylene glycol and butylene glycol are used as diols. The ester/ether block copolymers are said to be used as surface-active substances, as cutting oils or as hydraulic oils. The foam-regulating property of these or structurally similar compounds is neither recognized nor mentioned.

DE-OS 24 30 342 describes intermolecular esterification products of hydroxyalkane acids which are reacted with a carboxylic acid free from hydroxyl groups and an olefin oxide. The compounds in question are said to be used as textile lubricants, antistatic agents and dispersion aids for the dispersion of oils in water. The use of these or structurally similar compounds as foam regulators is not mentioned.

Acidic polyglycol esters of dicarboxylic acids and their production are described in U.S. Pat. No. 2,950,310. These substances have emulsion-breaking properties in water-in-oil emulsions and may be used in petroleum refining.

Defoamers based on carboxylic acid derivatives, for example esters and amides of citric acid, tartaric acid, succinic acid, maleic acid and ethylenediamine tetraacetic acid, are known from International patent application WO 92/11074. These defoamers may be used either directly or in the form of an emulsion in water either in the manufacture of paper or in the coating of paper.

The foam-inhibiting effect of carbonic acid esters of certain etherified alcohols is known from International patent application WO 92/11073. These substances are said to be used as defoamers in the food industry and in fermentation processes. DE-AS 12 42 569 describes the use of alkyl or alkoxyalkyl carbonates containing 4 to 22 carbon atoms per alkyl or alkoxyalkyl group as foam suppressors. However, the investigations on which the DE-AS is based involved branched-chain alcohols of which the biodegradability has recently been found to be in need of improvement.

Considerable significance is attributed to the control and prevention of foaming in the industrial manufacture or processing of foods. For example, in the industrial processing of sugar-containing plant juices, as is carried out on a large scale in the production of sugar from beet, particular difficulties are caused by excessive foaming in the production and purification of the juice and in the evaporators. The foam control formulations to be used in the sugar industry must of course be physiologically safe. The same also applies to foam control formulations which are used in the production of potato-based products, such as potato chips or pommes frites, or even in the production of baker's yeast using molasses. In addition, foam control formulations used in the potato-processing industry must be capable of regulating the starch foam which is so difficult to control. In addition, there is always a general need in practice for foam control formulations which have a good spontaneous and long-term effect in small quantities.

Fats and oils, such as rapeseed oil, peanut oil, olive oils and wool fat, have long been used for defoaming in the sugar industry and the yeast industry. Synthetic esters, such as fatty acid monoglycerides, fatty acid polyglycol esters, and synthetic alcohols, such as polyalkylene glycols, and adducts of alkylene oxide with fatty alcohols have also been proposed for this purpose. Although a certain foam-suppressing effect can be achieved with these compounds, the quantities required are often too large. Alternatively, the compounds are only effective at certain temperatures.

In the case of lacquers and paints, air can be stirred in during homogenization of the lacquer or paint constituents. This is a particular disadvantage because either the user has to wait a considerable time for the air bubbles to burst before he can begin to apply the lacquer or paint or, alternatively, the lacquer or paint coating shows bubbles. Lacquer or paint films with surface defects are not only visually unattractive, they also lack durability because dried bubbles easily lead to flaking of the paint or lacquer films. The most effective way of avoiding troublesome air bubbles both during homogenization and during application is to add foam control formulations based on silicones. Although these foam control formulations are capable of effectively destroying air bubbles, they are attended by the major disadvantage that the paint or lacquer coating on the various substrates to be coated, for example glass, is uneven. The highly hydrophobic silicones presumably do not uniformly wet the substrate to be coated.

Troublesome foaming can also occur in paper manufacture in view of the high air content in the water circuit of papermaking machines. Thus, foam stains can be left on the paper when the foam containing floated soil passes onto the paper web during sheet formation. Since constantly increasing machine speeds are being applied in papermaking, there is a greater danger of air becoming mixed with the fiber suspension. The air thus incorporated in the form of air bubbles interferes with the drainage of the paper stock in the papermaking machine and leaves the sheets of paper with a porous structure. These disadvantages are intensified in new papermaking machinery where the water circuits are increasingly becoming closed. Foam-forming and foam-stabilizing substances accumulate in the closed systems. In addition, the temperature of the water circulating through the papermaking machine can change during the production process. Accordingly, there is also a need in the papermaking industry for defoamers which are effective for long periods in small quantities and over broad temperature ranges.

Foam regulation is also essential in water-containing wash liquors such as occur in the routine washing of laundry in washing machines, for example in the institutional sector, but also in domestic drum-type washing machines, because excessive foaming on the one hand and the complete absence of foam on the other hand are not compatible with the required washing result. Accordingly, there has been no shortage of attempts to solve the problem of excessive foaming of detergents in washing machines. Hitherto, silicone-based defoamers, which consist of generally liquid polysiloxanes with alkyl or aryl substituents and fine-particle silica, have been the most effective known foam regulators, based on the quantity required. However, despite their well-known defoaming effect, polysiloxanes are relatively expensive to produce and have the disadvantage that their biodegradability has not always been found to be entirely satisfactory, especially in recent years. Silicone-free foam regulating formulations for detergent liquors are also known. Thus, European patent EP 87 233, for example, describes a process for the production of a low-foaming detergent in which mixtures of an oily or wax-like substance and bisamides are applied to a powder-form support, more particularly a spray-dried surfactant-containing detergent. The oily or wax-like substance may consist, for example, of vaseline with a melting point of 20° C. to 120° C. In this method of production, i.e. spraying of the foam control formulation onto the spray-dried surfactant-containing detergent, there is the danger that the production process can have an adverse effect on the stability of the foam regulating component in storage, with the result that its activity decreases with increasing storage time. In order to increase their effect and, at the same time, to reduce the necessary in-use concentration, other foam inhibitors, particularly the known polysiloxanes or polysiloxane/silica mixtures, are often added to these defoamers. Other foam-regulated detergents are known from European patents EP 75 433 and EP 94 250. However, the foam regulating formulations described in these documents also contain silicones and are unsuitable for the reasons explained above. DE-OS 28 57 155 describes foam-regulated detergents in which the foam regulating component contains hydrophobic silicon dioxide and a mixture of solid and liquid hydrocarbons, optionally in admixture with fatty acid esters. In view of the high content of hydrocarbon liquid at room temperature, namely 22.5% by weight to around 98% by weight, the foam regulating components in question are in danger of forming lumps. DE-OS 34 00 008 describes foam regulating formulations containing paraffin wax mixtures and hydrophobicized silica, optionally in combination with branched-chain alcohols. Powder-form defoamers containing a liquid mixture of relatively high molecular weight, branched-chain alcohols with hydrophobicized silica in combination with a water-insoluble wax on a water-soluble powder-form support are known from DE-OS 31 15 644. Foam regulating formulations containing a relatively expensive mixture of paraffin wax and microcrystalline paraffin wax are described in European patent application EP 309 931.

In view of the recent increase in the significance of machine washing at low temperatures, all defoamers of the type in question have often been found to be lacking in their defoaming effect and cannot always be satisfactorily incorporated in detergents or cleaning composition from the point of view of stability in storage. In addition, the compounds mentioned do not always show entirely adequate biodegradability.

Accordingly, the problem addressed by the present invention was to provide a foam regulator which would be universally usable in water-based systems with a tendency to foam, which would have a good spontaneous effect in small quantities and which would retain that effect for long periods. In addition, the foam regulator would lend itself to "tailoring" in such a way that it would be effective even at low temperatures and would still develop its effect over a broad temperature range. In addition, it would be able to be made up in the form of a free-flowing foam regulating formulation and, even in ready-made detergents and cleaning compositions, would be effective over a broad temperature range, i.e. in the case of laundry detergents would suppress troublesome foaming at temperatures in the cold-wash range, at medium washing temperatures and even at temperatures in the boil-wash range. In addition, both the foam regulator and the foam-regulating formulation containing it would remain stable in storage and in effectiveness in admixture with other typical ingredients of the water-based systems to be defoamed and would not have any adverse effects either on the laundry or on the environment. For use in the paint and lacquer industry, the foam regulators would not only have a good defoaming effect, they would also provide for uniform paint or lacquer coatings. The same would also apply in particular to the coating of paper where a uniform coating with no surface defects is essential.

It has now surprisingly been found that this problem can be solved by certain block polymers of hydrophilic polyethylene glycol ether blocks which are attached by ester bonds to more hydrophobic blocks formed from optionally polymeric hydroxycarboxylic acids.

SUMMARY OF THE INVENTION

Accordingly, the present invention relates to the use of block polymers containing ester groups corresponding to general formula (I):

$$A-(CH_2CH_2O)_n-B \quad (I)$$

in which n is a number of 4 to 300 and, more particularly, 5 to 250, A is an optionally polymeric hydroxycarboxylic acid residue and B is hydrogen, an alkyl or alkenyl radical containing 1 to 22 carbon atoms, more particularly 1 to 8 carbon atoms, a phenyl or benzyl radical or has the same meaning as A, as foam regulators for water-based systems with a tendency to foam.

The block polymer preferably corresponds to general formula (II):

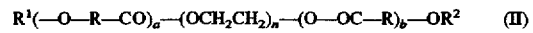

$$R^1(-O-R-CO)_a-(OCH_2CH_2)_n-(O-OC-R)_b-OR^2 \quad (II)$$

in which the degree of ethoxylation n has the meaning defined for formula I and, in particular, is a number of 6 to 100, R is a linear or branched alkylene or alkenylene radical containing 1 to 43 carbon atoms and more particularly 2 to 18 carbon atoms, a is a number of 1 to 550 and, more particularly, a number of 2 to 170 and b is a number of 0 to 550 and, more particularly, a number of 1 to 170, $R^1$ and $R^2$ independently of one another represent hydrogen or an acyl group $R^3CO-$ where $R^3$ is hydrogen or an alkyl or alkenyl radical containing 1 to 21 carbon atoms. Among these block polymers, compounds obtainable by reaction of monomeric hydroxycarboxylic acids with polyethylene glycol in a ratio by weight of 60:40 to 99:1 and, more particularly, 80:20 to 98:2 are particularly preferred. The polyethylene glycol used preferably has a molecular weight of 300 to 1000.

The present invention also relates to a granular free-flowing foam regulating formulation which contains 0.5% by weight to 30% by weight of a block copolymer to be used in accordance with the invention adsorbed onto 70% by weight to 99.5% by weight of a granular, substantially inorganic phosphate-free support material.

DETAILED DESCRIPTION OF THE INVENTION

The block polymers to be used in accordance with the invention are substances containing ester groups which are obtainable by reaction of polyethylene glycols with hydroxycarboxylic acids. They are preferably compounds obtainable by reaction of 2 to 1500 and, more particularly, 2.5 to 200 mole equivalents of monomeric hydroxycarboxylic acid with 1 mole equivalent of polyethylene glycol. The polyethylene glycol preferably has a molecular weight of 300 to 1000.

Suitable hydroxycarboxylic acids include ω-hydroxycarboxylic acids containing 2 to 44 carbon atoms which are obtainable, for example, by selective reduction of corresponding dicarboxylic acids or derivatives which may even be mono- or polyunsaturated. Long-chain dicarboxylic acids are obtainable in known manner by dimerization of monocarboxylic acids, more particularly fatty acids. Besides glycolic acid, examples of such ω-hydroxycarboxylic acids are 10-hydroxydecanoic acid, 11-hydroxyundecanoic acid and 12-hydroxydodecanoic acid. Branched-chain hydroxycarboxylic acids in the C-chain range mentioned are also suitable. Of these, lactic acid and ricinoleic acid (12-hydroxyoctadec-9-enoic acid in all stereoisomeric forms) and the 12-hydroxystearic acid obtainable therefrom by hydrogenation are particularly preferred.

The block polymers to be used in accordance with the invention may be prepared by esterifying reaction of polyethylene glycol having a molecular weight in the range from 200 to 8000 with a hydroxycarboxylic acid or a reactive hydroxycarboxylic acid derivative, more particularly a lactone or other cyclic esters or compounds corresponding to formula (III):

$$H(-O-R-CO)_a-X \quad \text{(III)}$$

in which R is a linear or branched alkylene or alkenylene radical containing 1 to 43 carbon atoms, a is a number of 1 to 550 and, more particularly, the number 1 and X represents OH, OR$^4$ or Cl, where R$^4$ is an alkyl radical containing 1 to 8 carbon atoms, more particularly a methyl or ethyl group, optionally in the presence of esterification catalysts, at temperatures in the range from 20° C. to 220° C. and more particularly at temperatures in the range from 100° C. to 200° C. and optionally in a solvent that is inert under the reaction conditions. The polyethylene glycol and the optionally polymeric hydroxycarboxylic acid or reactive hydroxycarboxylic acid derivative are preferably used in molar ratios of 1:2 to 1:1500 and, more particularly, in molar ratios of 1:2.5 to 1:200. To obtain compounds corresponding to formula II, in which R$^1$ and R$^2$ are not hydrogen, the reaction product obtained may subsequently be reacted with a carboxylic acid free from hydroxyl groups or a reactive derivative thereof which leads to compounds of formula II correspondingly end-capped with ester groups. These compounds may even be produced by a single-stage process in which carboxylic acids partially free from hydroxyl groups or derivatives thereof are used together with the hydroxycarboxylic acid.

The block copolymers to be used in accordance with the invention are liquid to highly viscous products which, in some cases, may even be regarded as solid. When the block polymers are added to foaming systems, a considerable reduction in foaming is observed even in the presence of very small quantities. The block polymers are suitable both for reducing foam which has already formed and for preventively avoiding foaming and are also capable of acting as deaerators. The block polymers may be added to the systems as such or even in the form of solutions or dispersions. If solutions or dispersions are to be used, a liquid organic medium, for example an alcohol, ester or methylene chloride, may be employed. However, water may also be used as solvent. If the block polymers have high contents of polyethylene glycols, they are self-emulsifiable in water, i.e. they can be emulsified or dispersed in water without the addition of external emulsifiers. However, if the hydrophobic component predominates in the block polymers, it is necessary either to use other solvents or to add external emulsifiers. Whether or not the block polymers are self-emulsifiable can be determined by simple small-scale tests in which water is added to the substances and an attempt is made to form an emulsion or dispersion by stirring.

The block polymers may be used in the paper industry in the production of pulp, for example in the boiling of sulfite pulp, in the production of paper and in the coating of paper. In addition, the block polymers may be used in the food industry, in the production and processing of foods, for example in the sugar industry in the flotation of beet and in the washing and slicing of the sugar beet, in the extraction of sugar from the beet chips and in the subsequent treatment with milk of lime and also in the multistage evaporators in which water is removed until a crystal sludge supersaturated with sugar (the so-called "massecuite") is formed. The block polymers may also be used in the yeast industry in the industrial production of baker's yeast by fermentation. In this case, very large quantities of foam occur, above all in the aerobic fermentation stage, and can be prevented or reduced with the block polymers. The block polymers may also be used in the potato processing industry because they are able to regulate the starch foam which is so difficult to control. The block polymers may also be used without difficulty in the paint and lacquer industry, i.e. above all they do not in any way impair the quality of the paints and lacquers, but still destroy all the foam which is formed in particular through the introduction of air. The quantity of block polymers used varies according to the particular field of application. In principle, they should be added in small quantities on economic grounds alone. In general, the block polymers are used in quantities of 10 to 10,000 ppm.

In its most simple form, the use according to the invention can be implemented by adding a block polymer of the type described above to a water-based system that would tend to foam undesirably without this addition. The block polymer may be added either as such, in the form of a solution in a preferably water-miscible organic solvent or in the form of a suspension or dispersion in water. The water-based systems with a tendency to foam which can be defoamed or foam-regulated with the block polymers to be used in accordance with the invention include not only those mentioned above, but also water-containing washing liquors or cleaning solutions, textile dyeing or pretreatment baths, pulps for pulp or paper manufacture and sugar-containing plant juices of the type which accumulate in the food industry in the processing of molasses and sugar beet.

In one preferred embodiment, the block polymers to be used in accordance with the invention are used in the form of granular free-flowing foam regulating formulations which contain the block polymers mentioned. This is particularly useful when the block polymers are to be added to solid or particulate formulations.

The phosphate-free support material for making up the block polymers to be used in accordance with the invention into a free-flowing foam regulating formulation particularly suitable for use in powder-form detergents and cleaning compositions has a granular structure and consists of water-soluble or water-dispersible compounds, above all inorganic and optionally additional organic salts which are suitable for use in detergents and cleaning compositions. In addition to typical neutral salts, for example alkali metal sulfates or alkali metal chlorides, particularly suitable support materials may contain typical washing alkalis, for example alkali metal carbonates or silicates, inorganic builders, for example alumosilicates, layer silicates, for example bentonites, and inorganic oxygen-based bleaching agents, for example alkali metal perborates or percarbonates. In one embodiment of the foam regulating formulation according to the invention, the last-mentioned bleaching agents are preferably used as the support material or as a constituent of the support material. Mixtures of inorganic and organic salts may often be used with advantage, organic support materials preferably being present in quantities of no more than 20% by weight and, more particularly, in quantities of 2% by weight to 15% by weight, based on the support material as a whole. In another embodiment of the foam regulating formulation according to the invention, the support material preferably contains both alkali metal carbonate and alkali metal silicate. In this case, the support material preferably contains 1% by weight to 50% by weight of alkali metal carbonate, up to 70% by weight of alkali metal sulfate, up to 50% by weight of alkali metal alumosilicate and 10% by weight to 50% by weight of alkali metal silicate, but may additionally contain other water-soluble or water-insoluble, water-dispersible substances. The materials which may be additionally used include in particular alkali metal chlorides and layer silicates, for example bentonite. The alkali metal silicate is preferably a compound with a molar ratio of alkali metal oxide to $SiO_2$ of 1:1.5 to 1:3.5. The use of such silicates results in particularly favorable particle properties, more particularly high abrasion resistance but also a high dissolving rate in water. The alumosilicates which may be used in the support material for the foam regulating formulations according to the invention include in particular the zeolites, for example zeolite NaA and NaX. Suitable organic components of the support material are, for example, starch, acetates, tartrates, citrates, succinates, carboxymethyl succinates and the alkali metal salts of aminopolycarboxylic acids, such as NTA or EDTA, hydroxyalkane phosphonates and aminoalkane polyphosphonates, such as 1-hydroxyethane-1,1-diphosphonate, ethylene diaminotetramethylene phosphonate and diethylenetriamine pentamethylene phosphonate. Also suitable are water-soluble salts of polymeric or copolymeric carboxylic acids, for example polyacrylates and copolymers of acrylic acid and maleic acid. In every case, sodium is the preferred alkali metal in the alkali metal salts mentioned.

In addition, the support material may contain film-forming polymers, for example polyethylene glycols, polyvinyl alcohols, polyvinyl pyrrolidones and cellulose derivatives, as an organic component. Suitable cellulose ethers are, in particular, alkali metal carboxymethyl cellulose, methyl cellulose, ethyl cellulose, hydroxyethyl cellulose and so-called cellulose mixed ethers, for example methyl hydroxyethyl cellulose and methyl hydroxypropyl cellulose, and mixtures thereof. Mixtures of sodium carboxymethyl cellulose and methyl cellulose are preferably used, the carboxymethyl cellulose normally having a degree of substitution of 0.5 to 0.8 carboxymethyl groups per anhydroglucose unit and the methyl cellulose having a degree of substitution of 1.2 to 2 methyl groups per anhydroglucose unit. The mixtures preferably contain alkali metal carboxymethyl cellulose and nonionic cellulose ethers in ratios by weight of 80:20 to 40:60 and more particularly in ratios by weight of 75:25 to 50:50. Corresponding cellulose ether mixtures may be used in solid form or in the form of aqueous solutions which may be preswollen in the usual way.

In a preferred embodiment, the foam regulating formulations according to the invention contain no more than 10% by weight and, in particular, from 0.5% by weight to 3.5% by weight of surfactant. Surfactants are understood to be surface-active compounds in which part of the molecule is hydrophobic and which contain hydrophilic anionic, ampholytic, zwitterionic, cationic and nonionic groups which develop a cleaning or emulsifying effect in the form of aqueous solutions or dispersions. Surfactants are normally the foam-generating constituents of wash liquors and cleaning solutions. Accordingly, it is all the more surprising that these foaming constituents may be present in the foam regulating formulations according to the invention without in any way impairing their effectiveness. The hydrophobic part of surfactant molecules generally consists of a hydrocarbon radical or a substituted hydrocarbon radical or of a polyglycol ether group sparingly soluble in water, for example a polypropylene glycol ether group or polybutylene glycol ether group. The foam regulating formulations according to the invention preferably contain synthetic anionic surfactants of the sulfate or sulfonate type, more particularly alkylbenzenesulfonates and/or alkylsulfates, because surfactants of this type provide for particularly effective dispersion of the block copolymers in the production of the foam regulating formulations from aqueous dispersions of the block copolymers as described hereinafter. Surfactant contents of up to 30% by weight and, more particularly, from 5% by weight to 10% by weight, based on the block copolymer to be used in accordance with the invention, are preferred.

The production of a foam regulating formulation according to the invention may be carried out by applying the liquid block polymer optionally heated to beyond room temperature to the granular support material, for example by gradual addition, more particularly in the form of a spray, to the support material. Individual constituents of the support material as mentioned above and support particles produced therefrom beforehand may be separately used. The support particles, which may be produced in the usual way by granulation or by spray drying of an aqueous slurry of the support materials, is kept in motion by mixing elements or by fluidization in order to guarantee uniform impregnation of the support material. The spray mixers used for this purpose may be operated continuously or discontinuously.

An aqueous dispersion of the block polymer to be used in accordance with the invention may be used both in the described production process for a foam regulating formulation according to the invention and for the use of the block polymers in accordance with the invention. It is of particular advantage in this regard that the block polymers to be used in accordance with the invention are generally self-emulsifying. If desired, a film-forming polymer and/or surfactant of the type mentioned above may be used as a dispersion aid. In the production of granular foam regulating formulations, this procedure may necessitate the subsequent drying of the foam regulating formulation formed, for example in a fluidized bed dryer, depending on the water content of the dispersion and the water binder capacity of the support material used.

In another embodiment of the invention, the foam regulating formulation is produced by dissolving or suspending the support materials in water, dispersing the block copolymer to be used in accordance with the invention in the resulting solution or dispersion and subsequently spray-drying the slurry obtained. If desired, a water-soluble dispersion stabilizer in the form of a surfactant and/or water-swellable polymer may be added to the dispersion. Examples of suitable water-swellable polymers are the above-mentioned cellulose ethers, homopolymers and copolymers of unsaturated carboxylic acids, such as acrylic acid, maleic acid, and copolymerizable vinyl compounds, such as vinyl ethers, acrylamide and ethylene. The addition of such compounds acting as dispersion stabilizers in the aqueous slurry preferably amounts to no more than 5% by weight and, more particularly, is between 1% by weight and 3% by weight, based on the foam regulating formulation formed. The water content of the slurry may amount to between 30% by weight and 60% by weight, depending on the type or solubility of support material. Spray drying of the dispersion may be carried out in known manner in purpose-built plants, so-called spray drying towers, using hot drying gases flowing through the towers in co-current or counter-current.

A foam regulating formulation according to the invention preferably consists of particles no larger than 2 mm in size and, more particularly, between 0.1 mm and 1.6 mm in size. It preferably has an apparent density in the range from 300 grams per liter to 1100 grams per liter and, more particularly, in the range from 450 grams per liter to 900 grams per liter. It is preferably used for the production of powder-form detergents or cleaning formulations, another advantage of the foam regulating formulation according to the invention being the small quantity required to obtain a good defoaming effect.

EXAMPLES

Example 1

Preparation of the Block Polymers

Polyethylene glycol (PEG) and ricinoleic acid or 12-hydroxystearic acid in the ratios by weight shown in Table 1 below and a catalyst (0.1% by weight of tin dioctanoate) were reacted in boiling xylene with azeotropic removal of the water of reaction until the acid value had disappeared, after which the xylene was removed in vacuo. The block polymeric esters E1 and E2 were obtained in the form of highly viscous colorless liquids.

TABLE 1

|  | PEG-1000<sup>a)</sup> | RS<sup>b)</sup> | HSS<sup>c)</sup> |
|---|---|---|---|
| E1 | 90 | 10 | — |
| E2 | 90 | — | 10 |

<sup>a)</sup>Average molecular weight 1000
<sup>b)</sup>Ricinoleic acid
<sup>c)</sup>12-Hydroxystearic acid Example 2

To determine the defoaming effect of block polymers prepared as described in Example 1, 250 g of a 10% by weight aqueous solution of sugar beet and 200 microliters of a 10% by weight solution of block polymers in isopropanol were introduced into a 500 ml capacity screw-top glass flask. A mixture with a polyglycerol partial ester containing ethylene and propylene oxide units (C) was always prepared for comparison. Both mixtures were manually shaken 20 times in the flask at the same time. The time taken for the foam mountain to collapse to a foam surface in which a hole (approx. 5 cm in diameter) was torn was then measured. The shorter the time indicated in Table 2, the better the defoaming effect.

TABLE 2

| Foam collapse times | |
|---|---|
| Block polymer | Time [s] |
| E1 | 25 |
| E2 | 25 |
| C | >3600 |

Example 3

Granular foam regulating formulations were obtained simply by mixing 1% by weight of block polymer E1 or E2 from Example 1 with 10% by weight of powder-form sodium sulfate. The foam regulating formulations were then incorporated in universal detergent formulations free from foam inhibitors and, under in-use conditions in a domestic washing machine in concentrations of 1% by weight to 4% by weight, based on the detergent as a whole, showed defoaming performances which were in no way inferior to those of a conventional silicone foam inhibitor (used in the same quantity by weight, based on active substance).

We claim:

1. A method of regulating the foaming of water-based systems with a tendency to foam, said method comprising adding to a water-based system with a tendency to foam a block copolymer containing ester groups, said block copolymer corresponding to the general formula (I):

$$A—(CH_2CH_2O)_n—B \qquad (I)$$

in which n is an integer of 4 to 300, A is a hydroxycarboxylic acid residue and B is hydrogen, an alkyl or alkenyl radical containing 1 to 22 carbon atoms, a phenyl or benzyl radical or has the same meaning as A.

2. A method as claimed in claim 1 wherein in formula I, A is $R^1(—O—R—CO)_a$ and B is $(O—OC—R)_b—OR^2$, R is a linear or branched alkylene or alkenylene radical containing 1 to 43 carbon atoms, "a" is a number of 1 to 550, "b" is a number of 0 to 550 and $R^1$ and $R^2$ independently of one another represent hydrogen or an acyl group $R^3CO—$, where $R^3$ is hydrogen or an alkyl or alkenyl radical containing 1 to 21 carbon atoms.

3. A method as claimed in claim 2 wherein said block copolymer is a compound corresponding to formula (II), in which "n" is a number of 6 to 100, R is a linear or branched alkylene or alkenylene radical containing 2 to 18 carbon atoms, "a" is a number of 2 to 170, "b" is a number of 1 to 170, and $R^1$ and $R^2$ represent hydrogen.

4. A method as claimed in claim 1 wherein said block copolymer contains units from a member selected from the group consisting of ricinoleic acid, 12-hydroxystearic acid, and mixtures thereof.

5. A method as claimed in claim 1 wherein the water-containing system with a tendency to foam occurs in the production or further processing of foods or in fermentation processes.

6. A method as claimed in claim 1 wherein the water-containing system with a tendency to foam occurs in the production or further processing of paints, lacquers or plastics.

7. A method as claimed in claim 1 wherein the water-containing system with a tendency to foam is a surfactant-containing wash liquor or cleaning solution.

8. A method as claimed in claim 1 wherein the water-containing system with a tendency to foam is a water-containing textile dyeing or pretreatment bath.

9. A method of regulating the foaming of water-based systems with a tendency to foam, said method comprising adding to a water-based system with a tendency to foam a block copolymer containing ester groups, said block copolymer corresponding to the general formula (II):

in which "n" is a number of 6 to 100, R is a linear or branched alkylene or alkenylene radical containing 2 to 18 carbon atoms, "a" is a number of 2 to 170, "b" is a number of 1 to 170 and $R^1$ and $R^2$ represent hydrogen.

10. A method as claimed in claim 9 wherein R is derived from a member selected from the group consisting of ricinoleic acid, 12-hydroxystearic acid, and mixtures thereof.

11. A granular free-flowing foam regulating formulation comprising 0.5% by weight to 30% by weight of a block copolymer containing ester groups, said block copolymer corresponding to the general formula (I):

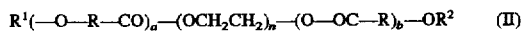

in which n is an integer of 4 to 300, A is a hydroxycarboxylic acid residue and B is hydrogen, an alkyl or alkenyl radical containing 1 to 22 carbon atoms, a phenyl or benzyl radical or has the same meaning as A, said block copolymer being adsorbed onto 70% by weight to 99.5% by weight of a granular, substantially inorganic phosphate-free support material.

12. A foam regulating formulation as claimed in claim 11 wherein said formulation contains 1% by weight to 25% by weight of said block copolymer and 75% by weight to 99% by weight of said support material.

13. A foam regulating formulation as claimed in claim 11 wherein said formulation contains 2% by weight to 12% by weight of said block copolymer and 88% by weight to 98% by weight of said support material.

14. A foam regulating formulation as claimed in claim 11 wherein said support material is further comprised of a member selected from the group consisting of alkalis, detergent builders, layered silicate, a bleaching agent, and mixtures of two or more of said members.

15. A foam regulating formulation as claimed in claim 11 wherein said support material is further comprised of a member selected from the group consisting of alkali metal carbonate, alkali metal silicate, alumosilicate, bentonite, alkali metal perborate, alkali metal percarbonate, and mixtures of two or more of said members.

16. A foam regulating formulation as claimed in claim 11 wherein in formula I, A is $R^1(\text{—O—R—CO})_a$ and B is $(\text{O—OC—R})_b\text{—OR}^2$, R is a linear or branched alkylene or alkenylene radical containing 1 to 43 carbon atoms, "a" is a number of 1 to 550, "b" is a number of 0 to 550 and $R^1$ and $R^2$ independently of one another represent hydrogen or an acyl group $R^3CO$—, where $R^3$ is hydrogen or an alkyl or alkenyl radical containing 1 to 21 carbon atoms.

17. A foam regulating formulation as claimed in claim 11 wherein said block copolymer is a compound corresponding to formula (II), in which "n" is a number of 6 to 100, R is a linear or branched alkylene or alkenylene radical containing 2 to 18 carbon atoms, "a" is a number of 2 to 170, "b" is a number of 1 to 170, and $R^1$ and $R^2$ represent hydrogen.

18. A foam regulating formulation as claimed in claim 11 wherein said block copolymer contains units from a member selected from the group consisting of ricinoleic acid, 12-hydroxystearic acid, and mixtures thereof.

19. A foam regulating formulation as claimed in claim 11 wherein said formulation further comprises a surfactant in an amount of no more than 10% by weight of said formulation.

20. A foam regulating formulation as claimed in claim 19 wherein said surfactant is present in an amount of from 0.5% to 3.5% by weight of said formulation.

21. A foam regulating formulation as claimed in claim 19 wherein said surfactant is present in an amount of up to 30% by weight of said block copolymer.

22. A foam regulating formulation as claimed in claim 19 wherein said surfactant is present in an amount of 5% to 10% by weight of said block copolymer.

23. A foam regulating formulation as claimed in claim 19 wherein said surfactant is selected from the group consisting of alkylbenzenesulfonates and alkyl sulfates.

24. A granular free-flowing foam regulating formulation comprising 2% by weight to 12% by weight of a block copolymer containing ester groups, said block copolymer corresponding to the general formula (II):

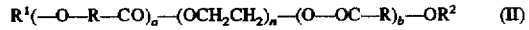

in which "n" is a number of 6 to 100, R is a linear or branched alkylene or alkenylene radical containing 2 to 18 carbon atoms, "a" is a number of 2 to 170, "b" is a number of 1 to 170 and $R^1$ and $R^2$ represent hydrogen, said block copolymer being adsorbed onto 88% by weight to 98% by weight of a granular, substantially inorganic phosphate-free support material.

25. A foam regulating formulation as claimed in claim 24 wherein R is derived from a member selected from the group consisting of ricinoleic acid, 12-hydroxystearic acid, and mixtures thereof.

26. A foam regulating formulation as claimed in claim 24 further comprising a surfactant selected from the group consisting of alkylbenzenesulfonates and alkyl sulfates in an amount of from 5% to 10% by weight of said block copolymer.

27. A process for the production of the granular foam regulating formulation claimed in claim 11 wherein said block copolymer is applied to the granular support material kept in motion.

28. A process as claimed in claim 27 wherein said block copolymer is applied to the granular support material at a temperature above room temperature.

29. A process as claimed in claim 27 wherein an aqueous suspension or dispersion of the block copolymer is used.

30. A process as claimed in claim 29 wherein a dispersion aid is used.

31. A process as claimed in claim 29 further comprising subjecting the foam regulating formulation to a subsequent drying step.

32. A process as claimed in claim 27 wherein said block copolymer is dispersed in an aqueous solution or slurry of the support material and the dispersion is spray-dried.

33. A process as claimed in claim 32 wherein said aqueous solution or dispersion is further comprised of a water-soluble or water-swellable polymer as a dispersion aid.

* * * * *